United States Patent [19]

Noguchi et al.

[11] Patent Number: 4,498,170
[45] Date of Patent: Feb. 5, 1985

[54] TIME DIVIDED DIGITAL SIGNAL TRANSMISSION SYSTEM

[75] Inventors: Toyota Noguchi, Kyoto; Michio Okamoto, Ikoma; Tadafumi Nishimura, Takarazuka; Yukio Sugimoto, Katano; Mamoru Kaneko; Kenjiro Nakayama, both of Neyagawa, all of Japan

[73] Assignee: Matsushita Electric Industrial Co., Ltd., Kadoma, Japan

[21] Appl. No.: 371,493

[22] Filed: Apr. 23, 1982

[30] Foreign Application Priority Data

Apr. 23, 1981 [JP] Japan .................................. 56-62040

[51] Int. Cl.³ .............................................. H04J 3/12
[52] U.S. Cl. ................................................ 370/110.1
[58] Field of Search ...................... 375/28; 370/62, 77, 370/110.1

[56] References Cited

U.S. PATENT DOCUMENTS

| | | | |
|---|---|---|---|
| 3,710,056 | 1/1973 | Tomozawa | 375/28 |
| 3,872,255 | 3/1975 | Nance et al. | 375/28 |
| 4,313,033 | 1/1982 | Walker et al. | 375/28 |
| 4,325,139 | 4/1982 | Van Dine | 375/28 |

OTHER PUBLICATIONS

IEEE Transactions on Communications, vol. COM-26, #11, (Nov. 1978), Auger et al., The Space Shuttle Ground Terminal Delta Modulation System.

*Primary Examiner*—Douglas W. Olms
*Assistant Examiner*—Kenneth I. Rokoff
*Attorney, Agent, or Firm*—Wenderoth, Lind & Ponack

[57] ABSTRACT

A time divided digital signal transmission system includes a transmitter for converting plural analog signals to digit signals, generating multiplexed time divided signals from the digital signals, and transmitting the multiplexed time divided signals by a digital data transmission circuit. The system further includes a receiver for receiving the multiplexed time divided signals, demultiplexing the multiplexed time divided signals so as to thereby obtain the original digital signals and converting the original digital signals back into the original analog signals. The system is arranged to effectively utilize both synchronizing signals and clock signals for the analog to digital conversion and the digital to analog conversion in the system.

2 Claims, 6 Drawing Figures

TIME DIVIDED DIGITAL SIGNAL TRANSMISSION SYSTEM

BACKGROUND OF THE INVENTION

This invention relates to a time divided digital signal transmission system comprising: a transmitter for converting plural analog signals to digital signals, generating multiplexed time divided signals from the digital signals, and transmitting the multiplexed time divided signals by a digital data transmission circuit; and a receiver for receiving the multiplexed time divided signals, demultiplexing the multiplexed time divided signals so as to thereby obtain the original digital signals, and converting the original digital signals back into the analog original signals. This invention relates more particularly to a time divided digital signal transmission system in which the synchronizing signals and clock signals thereof are effectively used for the analog-to-digital conversion and the digital-to-analog conversion.

The time divided digital signal transmission system is a kind of multiplexed digital signal transmission system which converts plural analog signals to digital signals, multiplexes the digital signals to obtain time divided signals, and transmits the time divided signals to a receiver. Generally, a manchester signal coding (phase coding) technique is used for the multiplexed digital signal transmission system. In this system, "1" and "0" of the manchester code are different in phase by 180° so that the DC signal level need not be transmitted, and the fundamental frequency for the digital transmission may be low. However, a synchronous signal (sync signal, hereafter) for demultiplexing the time divided signal must be transmitted together with the manchester code. The sync signal is transmitted by being superimposed on to the transmitted multiplexed digital signals, so that the analog signals can be reproduced synchronously in the receiver. In this way, the sync signal generated in the transmitter is reproduced in the receiver and can be effectively used.

SUMMARY OF THE INVENTION

An object of the present invention is to provide a time divided digital signal transmitting system in which a sync signal and a clock signal, which is produced from the sync signal, control both the analog-to-digital conversion in a transmitter and the digital-to-analog conversion in a receiver.

Another object of the present invention is to provide a time divided digital signal transmitting system having a delta modulator in a transmitter and a delta demodulator in a receiver, the two delta modulators being controlled by a sync signal and a clock signal generated in the transmitter. The delta modulator is a kind of analog-to-digital converter and has a very simple construction compared with the Pulse-Code Modulator which is used in conventional multiplexed digital signal transmission system.

BRIEF DESCRIPTION OF THE DRAWINGS

Hereinafter, a preferred embodiment of the present invention will be described in detail with the accompanying drawings in which.

DESCRIPTION OF THE PREFERRED EMBODIMENT

Figure 1:
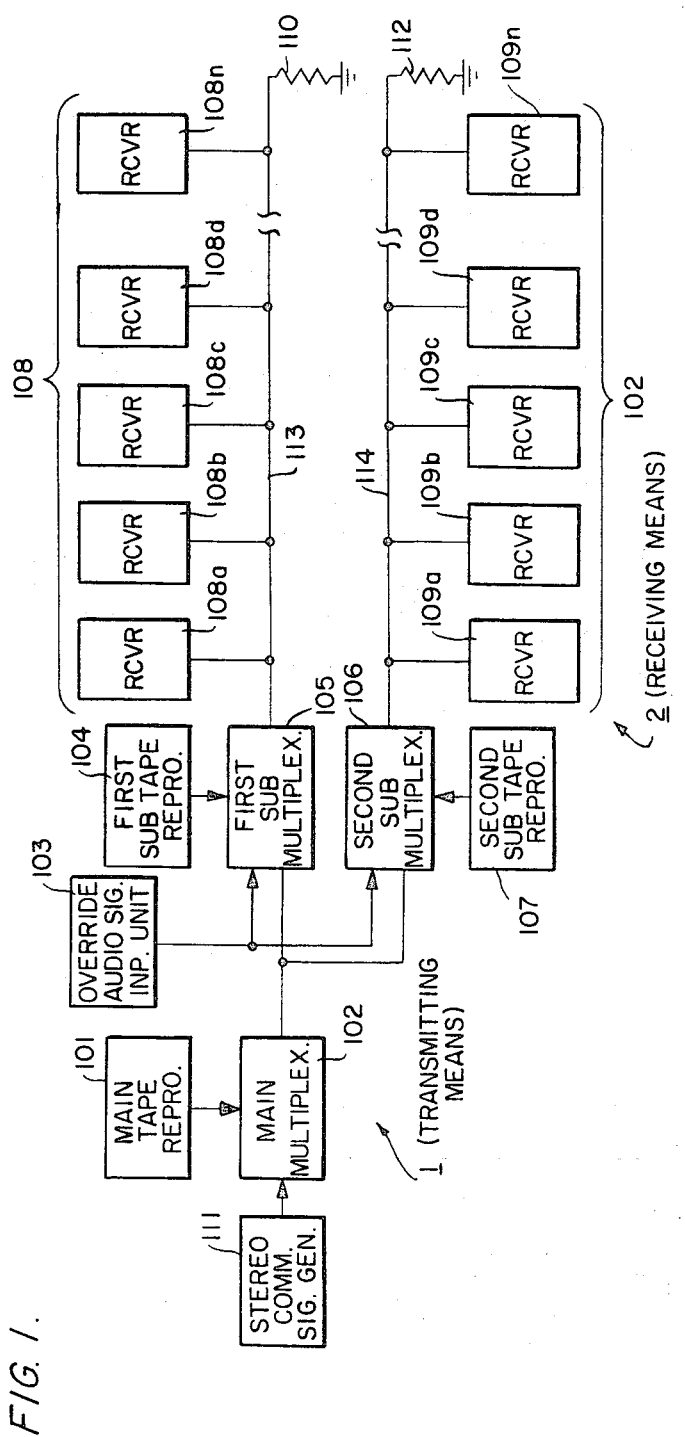
FIG. 1 is a block diagram of an embodiment of a time divided digital signal transmitting system according to the present invention.

Referring now to FIG. 1 which is a block diagram of a time divided digital signal transmission system according to the present invention, a transmitting unit 1 is consists of a main tape reproducer 101, first and second sub tape reproducer 104 and 107, a main multiplexer 102, a stereo command signal generator 111, an override audio signal input unit 103, and first and second sub multiplexers 105 and 106. A receiving unit 2 is consist of a first receiver group 108 having plural receivers 108a, 108b, ... 108n connected to the first sub multiplexer 105 through a transmission line 113 and a second receiver group 109 having plural receivers 109a, 109b, ... 109n connected to the second sub multiplexer 106 through a transmission line 114. Sub multiplexers 105 and 106 are matched to resistors 110 and 112 through transmission lines 113 and 114, respectively.

The main tape reproducer 101 can produce 10 channels of individual audio signals or 5 channels of stereo audio signals. The sub tape reproducers 104, 107 can produce 4 channels of individual audio signals or 2 channels of stereo audio signals. The stereo command signal generator 111 outputs a stereo command signal for distinguishing whether the channel audio signal from the main tape reproducer 101 is stereo audio signal or a monoaural audio signal, and for distinguishing whether the channel audio signals from the first and second sub tape reproducer 104 and 107 are stereo audio signals or monoaural audio signals. The main multiplexer 102 generates a manchester coded digital signal a shown in FIG. 2(a). The output signal of the main multiplexer 102 is produced by 10 channels of audio signals from the main tape reproducer 101 and stereo command signals from the stereo command signal generator 111. The 10 channel audio signals from the main tape reproducer 101 are converted to digital signals by a delta modulator in the main multiplexer 102. The stereo command signals from the stereo command signal generator 111 are encoded into serial signals by using a signal encoder in the main multiplexer 102. The converted digital signals and the encoded serial signals are multiplexed and manchester coded so as to form a time divided signal. The sync signal is superimposed on to the time divided signal so that the output signal is as shown in FIG. 2(a) is obtained.

Figure 2:
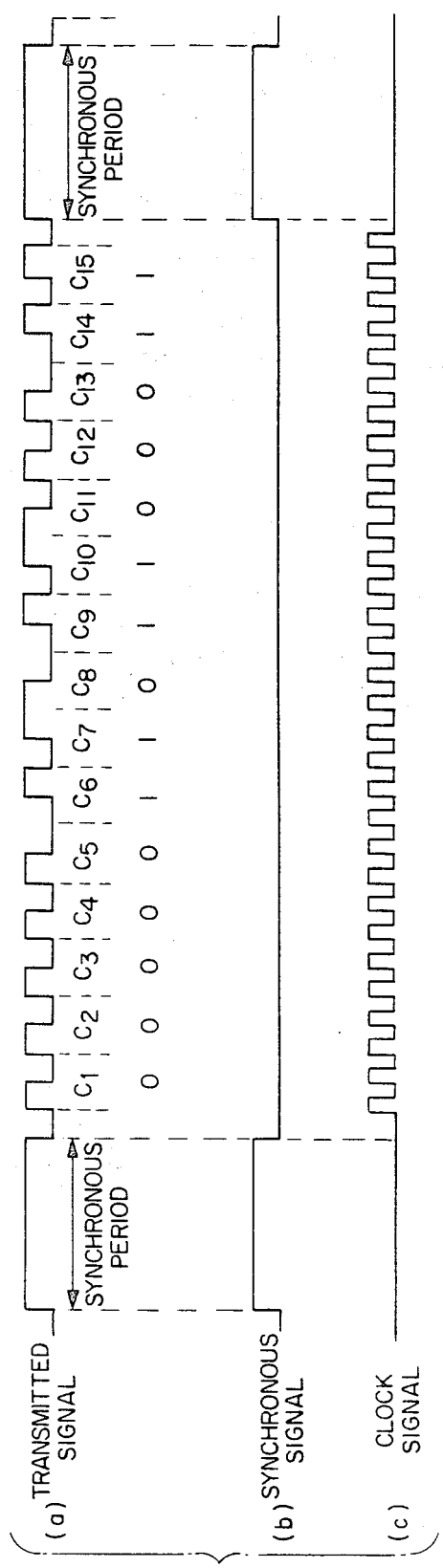
FIGS. 2(a)-(c) of signals transmitted in the system of FIG. 1.

In FIGS. 2(a)-(c), the encoded stereo command signals are assigned to time interval $C_1$, and the converted digital signals are assigned to time intervals $C_6$–$C_{15}$. The phases of the signals in $C_6$–$C_{15}$ and $C_1$ are controlled by the 10 channels of audio signals and the stereo command signals, respectively. But, during time intervals $C_2$–$C_5$ that are used by the submultiplexer, the main multiplexer stops controlling the operation. In FIGS. 2(a)-(d), the signal levels are zero during $C_2$–$C_5$. The signals in the time interval $C_1$–$C_{15}$ are manchester coded signals, but the sync signal is assigned to the sync period.

The first submultiplexer 105 and the second submultiplexer 106 are fed the output signal of the main multiplexer 102, the 4 audio output signals of the first sub tape reproducer 104 and the second sub tape reproducer 107, and an override audio signal from the override audio signal input unit 103. The first and the second sub multiplexers 105 and, 106 have memories, demultiplexers and delta modulators.

The demultiplexer is used to demultiplex the multiplexed signal from the main multiplexer 102. The memories temporarily store the digital demultiplexed signal. The delta modulator modulates 4 audio signals from the first and the second sub tape reproducers 104 and 107. The audio signal is converted to digital signals. These converted digital signals and the stored digital signals are manchester coded, and again multiplexed.

The stereo command signals and the 10 converted digital signals are assigned again to $C_1$ and $C_6$–$C_{15}$, respectively. The 4 converted digital signals are assigned to $C_2$–$C_5$. The phases of the signals of $C_2$–$C_5$ are controlled by the 4 audio signals from the sub tape reproducer. When the first and the second sub multiplexers 105 and 106 are fed an override audio signal from the input unit 103, they convert it to an override digital signal. The override digital signal is assigned to each of $C_2$–$C_{15}$. In this case, the command signals are changed to monoaural command signals. The first and the second sub multiplexers 105 and 106 have the same construction. These sub multiplexers are connected to the main multiplexer 102 and in parallel.

The receivers 108a, 108b, ... 108n and 109a, 109b, ... 109n demultiplex the signals from the first and the second sub multiplexers 105 and 106, and regenerate the original analog signals. The receivers 108a, 108b ... 108n and 109a, 109b, ... 109n have volume controllers and channel selectors. Thus, any channel and volume can be selected. The override audio signal is always obtained at the receivers when the override audio signal exists at the input unit 103.

Figure 3:
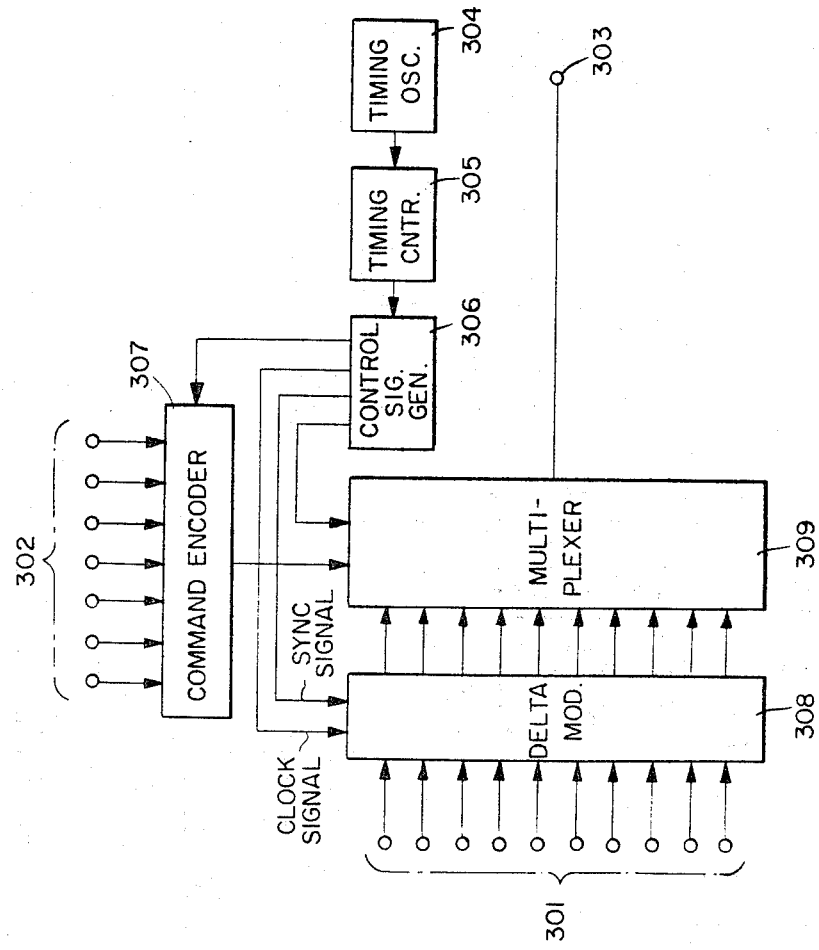
FIG. 3 is a block diagram of a main multiplexer of the system of FIG. 1.

Referring now to FIG. 3 which shows a block diagram of the main multiplexer, wherein the output of a timing oscillator 304 is connected to an input of a timing counter 305. The timing counter 305 counts the pulses from the timing oscillator 304, and outputs fundamental timing signals for producing sync and clock signals. The sync and clock signals which are illustrated in FIGS. 2(b) and (d) are generated by a control signal generator 306 from the fundamental timing signals. The sync signal from the control signal generator 306 is composed of six periods, that is, 1-Low, 4-High and 1-Low periods. The main tape reproducer 101 applies audio signals to delta modulators 308 through an input port 301. The applied audio signals are converted to digital signals which are assigned appropriately to the time intervals $C_6$–$C_{15}$. The stereo command signal generator 111 applies the stereo command signals to a command encoder 307 through a stereo command input port 302. The applied stereo command signals are encoded into a serial signal with the command encoder 307. The multiplexer 309 multiplexes said digital signals from the delta modulator 308 and said encoded serial signal from the command encoder 307, and encodes the multiplexed signals to manchester coded signals, and then inserts said sync signal. The output signal of the multiplexer 309 is output at an output port 303.

Figure 4:
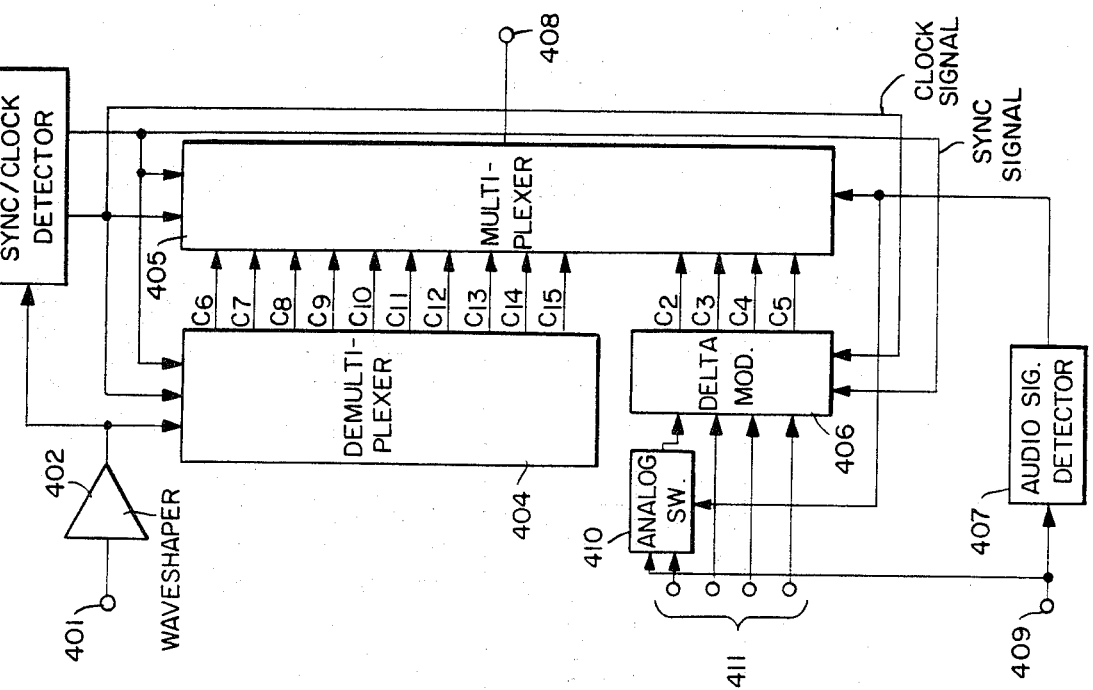
FIG. 4 is a block diagram of a sub multiplexer of the system of FIG. 1.

FIG. 4 shows a block diagram of the sub multiplexer. The output signal from the main multiplexer 102 is applied to an input port 401. The signal at the input port 401 is applied to a sync/clock detector 403 and a demultiplexer 404 through a wave shaper 402. The sync/clock detector detects the sync signal by counting the number of pulses during the period of time when the signal is high level. Then, the detector regenerates the clock signal which is shown in FIG. 2(c). The demultiplexer 404, the multiplexer 405 and the delta modulator 406 are synchronized with each other by the sync and clock signals generated by the sync/clock detector 403. The demultiplexer 404 demultiplexes the manchester coded signals in $C_6$–$C_{15}$ and then applies them to the multiplexer 405. The delta modulator 406 modulates (or converts) the input analog signals from an input port 411. The output signals of the modulator (in $C_2$–$C_5$) are applied to the multiplexer 405. The multiplexer 405 multiplexes the input signals (in $C_2$–$C_5$, $C_6$–$C_{15}$) and encodes them into manchester coded signals, and then inserts the sync signal. The manchester coded signals are time divided digital signals. An output port of the sub multiplexer is 408. The override audio signal is applied to an analog switch 410 and an override audio signal detector 407 through an override audio signal input port 409. The override audio signal detector 407 detects an input audio signal from the input port 409. When the override audio signal is detected, the override audio signal detector 407 generates control signals. One of the control signals controls the analog switch 410, and selects a channel from the override audio signal input 409 to the delta modulator 406. Thus, the signal in $C_2$ is the digital override audio signal. The other control signals control the multiplexer 405. The multiplexer 405 uses only the $C_2$ signal, so that the digital override audio signal in $C_2$ is assigned to $C_3$–$C_{15}$ (FIG. 2(a)). The multiplexer 405 generates the command signal which indicates all of the audio signals are monoaural.

Figure 5:
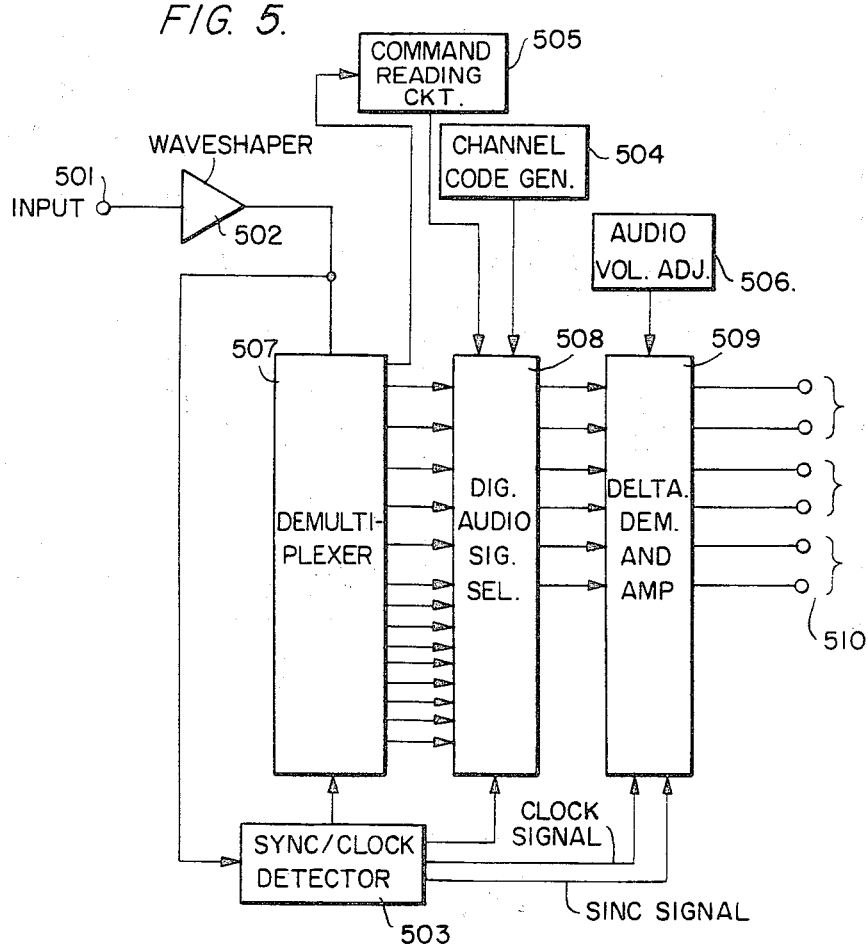
FIG. 5 is a block diagram of a receiver of the same system.

FIG. 5 shows a block diagram of a receiver. The signal to an input port 510 from one of the sub multiplexers 105 or 106 is the time divided manchester coded signal with the sync signal. A waveshaper 502 shapes the input signal, and applies it to a demultiplexer 507 and a sync/clock detector 503. The functions of the demultiplexer 507 and the demultiplexer 404, and the functions of the sync/clock detector 503 and the sync/clock detector 403 are the same, respectively. The demultiplexed signal in $C_1$ is applied to a command reading circuit 505. This demultiplexed signal is a stereo command signal. The command reading circuit 505 determines which channels are or are not stereo pairs. The output of the command reading circuit 505 and the output of the channel code generator 504 are applied to a digital audio signal selector 508 and the output digital audio signals are selected. The digital audio signal selector 508 has 14 digital audio signal inputs, and selects 6 digital audio signals from 14 digital audio signals. The digital audio signal selector 508 applies the 6 digital audio signals to a delta demodulator and amplifier 509. The demodulator and amplifier 509 demodulates the digital audio into an analog audio. An output of an audio volume adjustor 506 are applied to the demodulator and amplifier 509 to adjust the amplifier gain. Outputs of the delta modulator and amplifier 509 are 3 stereo audio signals or 3 monoaural audio signals and appear at an output port 510.

Next, the delta demodulator will be described in detail.

In general, there are two types of delta modulators, linear delta modulators, and adaptive delta modulators. The adaptive delta modulator has better frequency characteristics and a wide dynamic range compared with the linear delta modulator. In this system, an adaptive delta modulator is used. The adaptive delta modulator can change the step size of an integrator by checking the slope and the level of the input analog signal. The delta modulator has a local demodulator which has the same functions as those of the demodulator in the receiver. Thus, only the modulator will be described here.

Figure 6:
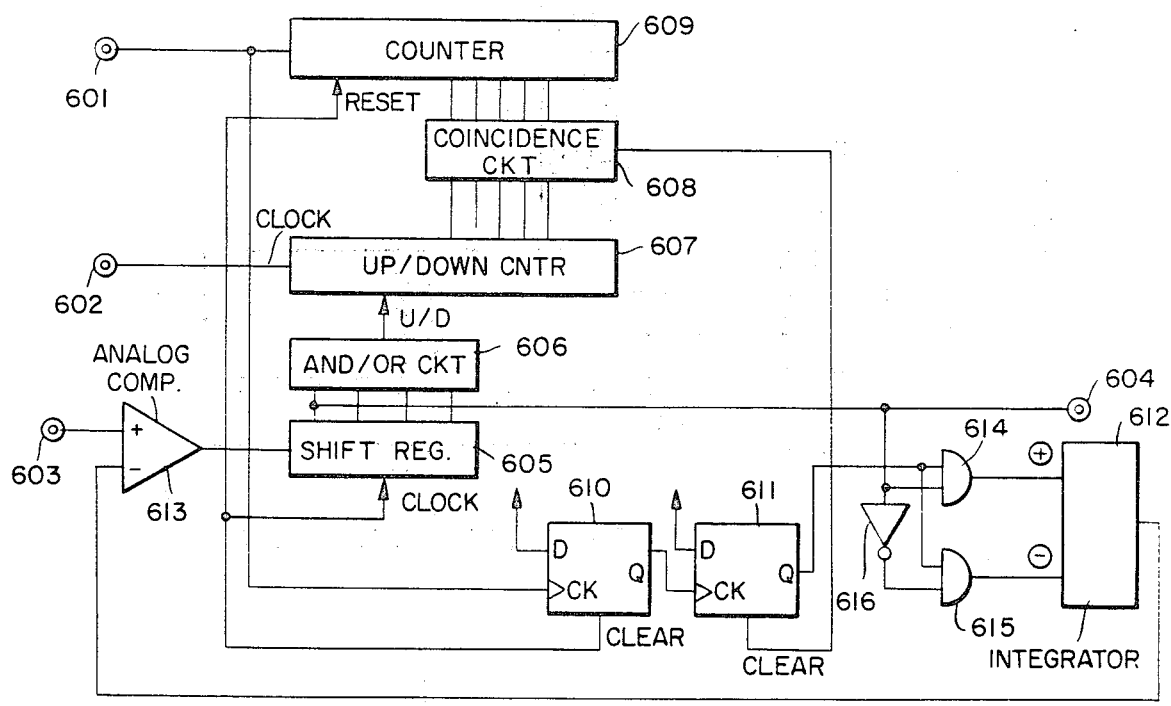
FIG. 6 is a block diagram of a delta modulator of the same system.

FIG. 6, shows an embodiment of an adaptive delta modulator according to the present invention. An analog comparator 613 compares the analog signal from an analog input 603 with the output analog signal of an integrator 612 and applies this output analog signal to an n-bit shift register (4 bit shift register) 605. The internal data of the n-bit shift register are shifted by a sync signal from an sync signal input port 602. The sync signal illustrated in FIG. 2(b) is applied to the port 602. The first bit of the n-bit shift register 605 is the output signal of this modulator, and this output signal appears at a digital data output port 604. The total internal data of the n-bit shift register 605 are used to determine the analog signal's history which indicates the past slope speeds or past signal levels. For example, when the internal data of the n-bit shift register 605 are all "0" or all "1", this shows that the output of the integrator cannot trace the analog signal from the analog input 603. The outputs of the n-bit shift register 605 are connected to inputs of an AND/OR circuit 606. The AND/OR circuit 606 outputs a "0/1 coincidence signal". The 0/1 coincidence signal is generated when the inputs of the AND/OR circuit 606 are all "0" or all "1". The "0/1" coincidence signal is used to determine whether the mode of an up/down counter 607 is its count-up or its count-down mode. In this case, the existance of the 0/1 coincidence signal shows that the up/down counter 607 is in its count-up mode. A signal from the sync signal input port 602 is used for the timing clock of this up-down counter 607. The up/down counter 607 is a 5 bit counter, so that the countable value thereof is from 1 to 32. In the count-up mode, the counter stops counting when the counted value becomes 32, and in the count-down mode, the counter stops counting when the counted value becomes 1. Another counter 609 is a 5 bit up-counter, and the timing clock thereof is the clock signal which is illustrated in FIG. 2(d) and which is input from the clock signal input port 601. The sync signal from the sync signal input port 602 is used as a reset signal for the counter 609. The clock signal illustrated in FIG. 2(c) has 30 pulses between two sync signals. Consequently, the internal value of the counter 609 cannot be over 30. A coincidence circuit 608 outputs the coincidence signal when the output signals of the counter 607 and the counter 608 are the same. The coincidence signal from the coincidence circuit 608 can clear a D type flip-flop 611. The Q output of another D type flip-flop 610 becomes a "High" level at the leading edge of the first pulse of the clock signals from the clock signal input port 601, and becomes a "Low" level when the sync signal from the sync signal input port 602 is a "Low" level. The Q output of the D type flip-flop 610 and the timing input port of the D type flip-flop 611 are connected together. Thus, the Q output of the D type flip-flop 611 becomes a "High" level when the Q output of the D type flip-flop 610 becomes a "High" level, and is cleared by the coincidence signal from the coincidence circuit 608. If the outputs of the analog comparator 613, i.e. the internal data of the shift register 605 are "1" or "0" continuously, then the "High" level period of the Q output of the D type flip-flop 611 becomes longer. The Q output of the D type flip-flop 611 and the first bit of the internal data of the shift register 605 are applied to a logic circuit consisting of 2-input AND gates 614 and 615 and an INVERTER 616. This logic circuit has two outputs respectively connected to the $\oplus$ and $\ominus$ inputs of the integrator 612. The output level of the integrator 612 becomes high when the $\oplus$ input is "High" and becomes low when the $\ominus$ input is "High". Namely, when the first bit of the internal data of the n-bit shift register 605 is positive, the integrator 612 outputs a positive signal. A longer "High" level period of the Q output of the D type flip-flop 611 causes remarkable changes of the output signal of the integrator 612. Consequently, the input analog signal changes the step size of integration.

In view of the foregoing, the present invention applies two delta modulators, both controlled by a sync signal and clock signals, to a time divided digital signal transmission system, and makes possible the processing of the sync and clock signals by digital processing techniques, thereby enabling the fabrication of the system by means of IC techniques.

What is claimed is:
1. A time divided digital signal transmission system comprising a transmitting means, a sub multiplexing means and a receiving means;

wherein said transmitting means comprises: a plurality of analog signal input terminals for inputting analog signals; a clock generator for generating a clock signal; a synchronous signal generator operatively coupled to said clock generator for generating a synchronous signal; a plurality of delta modulators operatively coupled to said analog signal input terminals, said clock generator, and said synchronous signal generator for converting said analog signals to digital signals under the control of said clock signal and said synchronous signal; a multiplexer operatively coupled to said delta modulators for multiplexing said digital signals so as to obtain a multiplexer digital signal;

wherein said sub multiplexing means comprises: a sub demultiplexer operatively coupled to said multiplexer for demultiplexing said multiplexed digital signal so as to obtain said digital signals; a plurality of sub analog signal input terminals for inputting sub analog signals; a sub delta modulator operatively coupled to said sub analog signal input terminals for converting said sub analog signals to sub digital signals; an override digital signal input terminal for inputting an override digital signal; a sub multiplexer operatively coupled to said sub demultiplexer, said sub delta modulator and said override digital signal input terminal for multiplexing said digital signals, said sub digital signals and said override digital signal such that said sub digital signals and said digital signals are alternately assigned to time intervals, and said override digital signal is assigned to the time intervals of said alternately assigned sub digital signals and digital signals so as to obtain a further multiplexed signal to be transmitted to said receiving means; and a sync/clock detector operatively coupled to said multiplexer for detecting and regenerating said synchronous signal and said clock signal, and also operatively coupled to said sub demultiplexer, said sub delta modulator and said sub multiplexer, so as to control said sub demultiplexer, said sub delta modulator and said sub multiplexer;

and wherein said receiving means comprises: a clock regenerator operatively coupled to said sub multiplexer for regenerating said clock signal; a synchronous signal regenerator operatively coupled to said clock regenerator for regenerating said synchronous signal; a demultiplexer operatively coupled to said sub multiplexer for demultiplexing said multiplexed digital signal so as to obtain said digital signals; and a plurality of delta demodulators operatively coupled to said demultiplexer, said clock regenerator and said synchronous signal regenerator for demodulating said digital signals under the control of said regenerated clock signal and said synchronous signal so as to obtain said analog signals.

2. A time divided digital signal transmission system according to claim 1, wherein said transmitting means further comprises a command encoder for encoding a command signal which indicates whether said analog signals comprise monaural signals or a pair of stereo signals, so as to obtain an encoded command signal which is multiplexed together with said digital signals by said multiplexer, and said demultiplexer of said receiving means demultiplexes said encoded command signals so as to obtain said command signal.

* * * * *